United States Patent [19]
Hibino et al.

[11] Patent Number: 5,148,977
[45] Date of Patent: Sep. 22, 1992

[54] CONTROL SYSTEM FOR AIR-CONDUCTIONER

[75] Inventors: Yozo Hibino, Chiyoda; Susumu Nakayama; Hiromu Yasuda, both of Shizuoka; Kensaku Oguni, Shimizu; Kenji Tokusa, Shizuoka, all of Japan

[73] Assignee: Hitachi, Ltd., Tokyo, Japan

[21] Appl. No.: 717,669

[22] Filed: Jun. 19, 1991

[30] Foreign Application Priority Data

Jun. 21, 1990 [JP] Japan .................. 2-163174

[51] Int. Cl.$^5$ .................. G05B 11/01; G01J 5/00
[52] U.S. Cl. .................. 236/49.3; 236/78 D; 374/132; 364/137; 395/61
[58] Field of Search ............ 236/78 D, 51, 91 C, 236/49.3; 395/61, 900; 364/137; 374/132

[56] References Cited

U.S. PATENT DOCUMENTS 4,777,585 10/1988 Kokawa et al. .................. 395/61

FOREIGN PATENT DOCUMENTS 55-95054 7/1980 Japan .
63-131942 6/1988 Japan .

Primary Examiner—William E. Wayner
Attorney, Agent, or Firm—Antonelli, Terry, Stout & Kraus

[57] ABSTRACT

The control system for the air-conditioner disclosed herein comprises means for setting a set value of a room temperature, means for detecting an actual value of the room temperature, means for detecting a radiant heat from walls etc. of the room as a radiation temperature, and an operational control means. The operational control means stores a comfort line which defines an inverse proportional relation between the room temperature and the radiation temperature, said comfort line depending upon set value of the room temperature. The operational control means calculates a first control index which is represented by a difference between the actual value and the set value of the room temperature and a second control index which is represented by a difference between the comfort line and the current temperature condition represented by the actual room temperature and the radiation temperature. The room temperature set value is modified in the operatal control means, according to fuzzy rule, on the basis of said first and second control indexes. The operational control means controls the air-conditioner, depending upon a difference between the modified value of the room temperature and the actual value of the room temperature, thereby providing a comfortable air-conditioned environment to a person staying in the room.

3 Claims, 6 Drawing Sheets

MEMBERSHIP FUNCTIONS RELATING TO $\Delta T$

MEMBERSHIP FUNCTIONS RELATING TO D

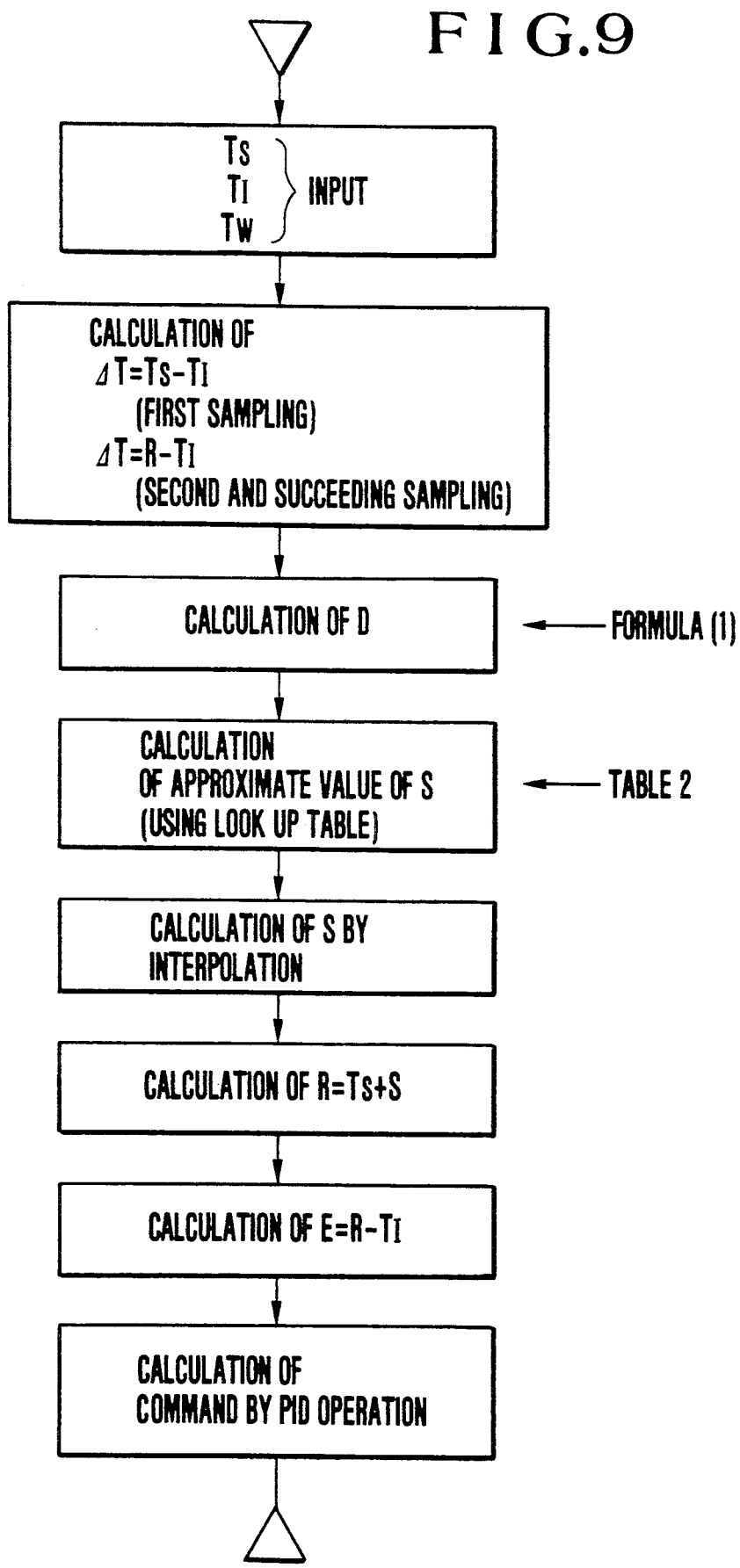

CONTROL SYSTEM FOR AIR-CONDUCTIONER

BACKGROUND OF THE INVENTION

1. Field of the Invention

The present invention relates to a control system for an air-conditioner and, more particularly, it relates to a control system for an air-conditioner which controls air-conditioned circumstances in a room to provide a comfortable condition with due regard to the factors other than the room temperature.

2. Description of the Prior Art

Heretofore, the system as disclosed in Japanese Patent Application Laid-Open No. 55-95054 has been proposed as one of the control systems of this kind. This system is used in an air-conditioner for adjusting a room temperature and humidity in which the surface temperature of the body of a person in a room is indirectly detected by means of an infrared ray temperature detector, while the surface temperature of a room wall is detected, and these temperatures are adopted as control indexes for controlling said room temperature. The room temperature is adjusted so as to compensate for the radiation from the cold or hot wall surface, that is, the room temperature is adjusted to a relatively high temperature when the wall surface temperature is abnormally low, while the room temperature is adjusted to a relatively low temperature when the wall surface is abnormally high, so that the surface temperature of the body is always held at about 32°-33° C.

Also, the system as disclosed in Japanese Patent Application Laid-Open No. 63-131942 has been heretofore proposed. This system comprises detecting means for detecting an information representing an environmental condition of an object to be air-conditioned, a memory for storing a control rule based on an empirical rule for obtaining an operating amount of the air-conditioner corresponding to said information, and computing means for computing the operating amount to be applied to said air-conditioner by the fuzzy logic operation on the basis of the information detected by said detecting means and the control rule which is taken out from said memory, whereby the air-conditioner can be finely controlled so as to attain a high degree of comfortableness for the person in the room, depending on the information representing the temperature as well as other various environmental conditions.

OBJECT OF THE INVENTION

The first one of the above-mentioned Japanese Laid-Open Patent Applications is directed to the art in which the room temperature is adjusted to a relatively high or relatively low temperature so as to compensate for the influence of the radiation from the low or high temperature wall surface, in order to adjust the body surface temperature to 32°-33° C. which is a most comfortable temperature range. However, the value of the body surface temperature is within a very narrow range and, therefore, in case where the temperature of the wall surface is abnormally high or low, it is a very difficult problem to decide the temperature to which the room temperature is to be corrected. The above laid-open patent application is silent as to the detailed method to solve such difficult problem and, therefore, it is doubtful how the high degree of comfortable air-conditioning can be attained. There are further problems of requiring an air-conditioner of larger capacity or requiring control instruments of higher cost, in order to realize the high degree of comfortableness.

The second one of the above-mentioned Japanese Laid-Open Patent Applications is directed to a general method of controlling an environmental condition of an object to be air-conditioned. The above-described general method itself has been well known in the art and said patent application is silent as to the details of the control rule which constitutes the technical important part, so that it is doubtful if this art can be realized.

It is an object of the present invention to provide a control system which is arranged to specify a comfortable environmental condition of an object to be air-conditioned and to control the actual environmental condition into the comfortable state.

SUMMARY OF THE INVENTION

In accordance with the present invention there is provided a control system for an air-conditioner including means for setting a set value of a room temperature, means for detecting an actual value of the room temperature and control means for controlling the air-conditioner to adjust the room temperature depending upon the difference between the set value and the actual value of the room temperature, said control system comprising:

radiation temperature detecting means for detecting a radiation temperature; and means for modifying the set value of the room temperature on the basis of a first control index represented as the difference between the set value and the actual value of the room temperature and a second control index represented as the difference between a temperature condition in the room and a comfort line, said temperature condition being represented by the room temperature and the radiation temperature, and said comfort line defining an inverse proportional relation between the room temperature and the radiation temperature, depending upon the set value of the room temperature.

In accordance with an embodiment of the present invention there is provided a control system for an air-conditioner of the above kind, wherein said means for modifying the set value of the room temperature is arranged to effect the modification of the set value of the room temperature on the basis of membership functions concerning said first control index and said second control index, according to a fuzzy rule for determining the amount of modification of the set value of the room temperature by said membership functions.

In accordance with another embodiment of the present invention there is provided a control system for an air-conditioner of the above kind, wherein said means for modifying the set value of the room temperature is arranged to effect the modification of the set value of the room temperature, by using a lookup table which determines the amount of modification of the set value of the room temperature in accordance with said first and second control indexes.

According to the present invention, the temperature condition of the object to be air-conditioned is defined by the room temperature detected by the room temperature detecting means and the radiation temperature detected by the radiation temperature detecting means. The difference between the set value and the actual value of the room temperature corresponds to a difference between the actual value of the room temperature and a value required by a person staying in the room, and this difference is adopted as a first control index.

Furthermore, it is noted that better comfortable temperature condition for the person in the room is obtained by adopting the set value of the room temperature as representing a sensible temperature for the person than simply adopting it as representing the actual room temperature. Accordingly, a comfort line is assumed which defines an inverse proportional relation between the room temperature and the radiation temperature. Said comfort line is set depending upon the first set value of the room temperature. A difference between said comfort line and the actual temperature condition is adopted as a second control index.

The capacity of the air-conditioner is adjusted according to the above-mentioned two control indexes, so that a comfortable temperature condition is maintained to make the above-mentioned differences zero, whereby a comfortable temperature condition required by the person in the room can be attained. Thus, it is possible to directly control the degree of comfortableness which has not been clearly solved in the conventional system.

BRIEF DESCRIPTION OF THE DRAWINGS

FIG. 9 is a flowchart showing the processing in another embodiment of the invention.

DESCRIPTION OF THE PREFERRED EMBODIMENTS OF THE INVENTION

Figure 1:
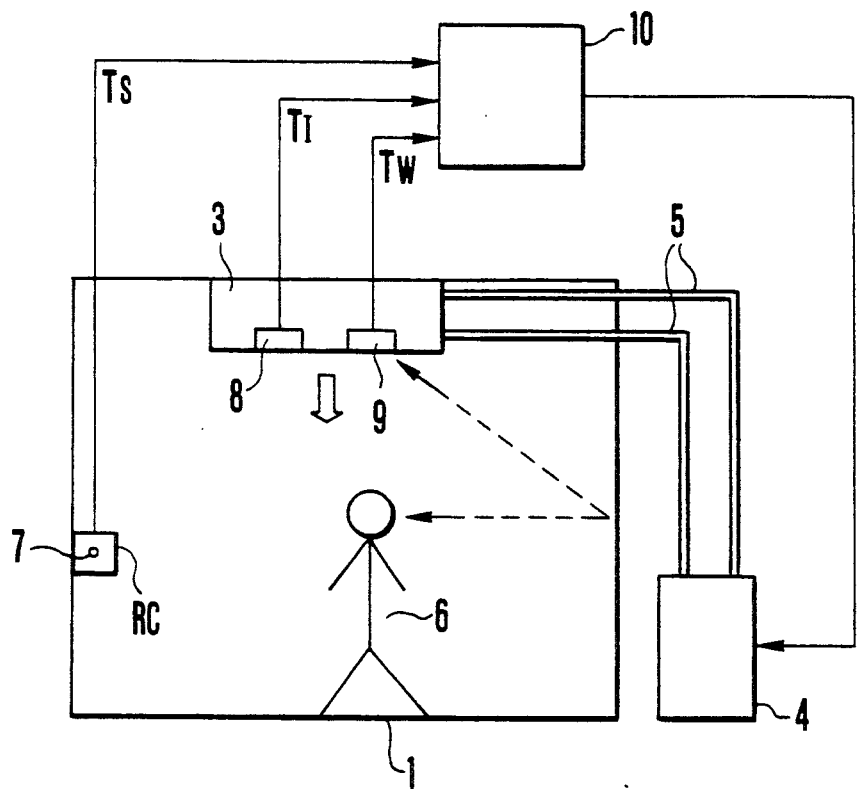
FIG. 1 illustrates an air-conditioned environment to which the air-conditioner including the control system according to the present invention is applied.

Now the invention will be explained with reference to the embodiments shown in the drawings.

FIG. 1 generally illustrates an environment to which the air-conditioner having the control system according to the present invention is applied. In FIG. 1, 1 designates a room including walls, a floor, a ceiling, windows etc. The air-conditioner is of refrigerating and heat pump cycle type, which includes an indoor unit 3 disposed in the room, an outdoor unit 4 disposed outside of the room and a coolant conducting piping 5 which connects the indoor unit with the outdoor unit. This air conditioner is arranged to adjust the room temperature within the room by means of the indoor unit 3 to effect room cooling or room heating to provide a comfortable air-conditioned environment for a person staying in the room. The room cooling or room heating capacity of the air-conditioner can be controlled by changing the frequency of an inverter for driving the coolant compressor which changes the rotating speed of said compressor.

The control system for the air-conditioner comprises a setting instrument 7 for manually setting a set value Ts of the room temperature desired by a person 6 staying in the room, a room temperature detector 8 for detecting an actual value $T_I$ of the room temperature (air temperature within the room), a radiation temperature detector 9 for detecting a radiation temperature Tw (hereinafter described in detail) which is caused by radiations from the walls, the floor, the ceiling, the windows etc., and an operational controller 10 which receives and processes signals from them, as hereinafter described, and feeds a command signal to the air-conditioner.

The room temperature setting instrument 7 is arranged to set a numerical set value of the room temperature by means of a slide switch, a pushbutton or the like. The room temperature detector 8 is arranged to directly detect a temperature within the room (i.e. room temperature) by means of a temperature sensor such as thermistor, thermocouple or the like, to output a room temperature signal.

Figure 2:
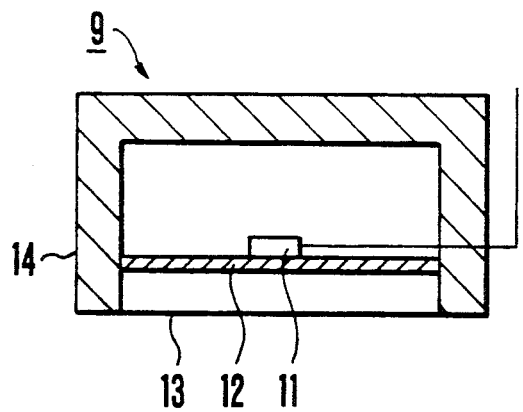
FIG. 2 is a cross-sectional view of the radiation temperature detector.

The radiation temperature detector 9 has a construction shown as a cross-sectional view in FIG. 2. The radiation temperature detector has a temperature sensor 11, such as thermistor, thermocouple or the like, which is mounted on a heat receiving or emitting plate 12. Said plate 12 is arranged to receive the heat radiated from the walls, the floor, the ceiling, the windows or the like in the room 1, which raises or lowers the temperature of the heat receiving or emitting plate 12, which is detected as the radiation temperature. The detector 9 further includes a transparent protecting cover 13 and a casing 14 for supporting said cover. The radiation temperature detected by said detector 9 does not always precisely correspond to the temperature of the wall surface, depending upon the factors such as the performance of the temperature sensor or the position where the sensor is mounted and, in general, the detected radiation temperature tends to be lower than the actual wall temperature. Accordingly, in the operational processing as hereinafter described, the detected radiation temperature is corrected by multiplying a predetermined coefficient.

Figure 3:
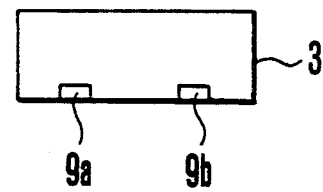
FIGS. 3 and 4 illustrate examples of the arrangement of the radiation temperature detector.
Figure 4:
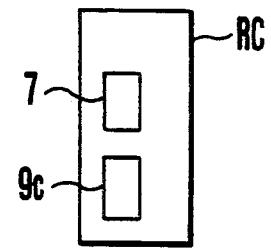

Referring to the arrangement of the radiation temperature detector, two detectors 9a and 9b are arranged on the indoor unit 3 as shown in FIG. 3, for example. A remote controller RC including the radiation temperature setting instrument 7 and the radiation temperature detector 9c, as shown in FIG. 4, may be used to control the indoor unit 3 from a remote position in the room. If necessary, a plurality of the radiation temperature detectors may be disposed at the other positions of the room. By effecting arithmetic operation (for example averaging operation) of the detected values of the plurality of radiation temperature detectors, it is possible to detect the averaged value of the plural radiation temperatures. The averaged value of the plural radiation temperatures is adopted as the radiation temperature Tw, in the illustrated embodiment. Thus, it is possible to detect, as the radiation temperature Tw, the radiated heats which are substantially equal to those which the person staying in the room receives.

Figure 5:
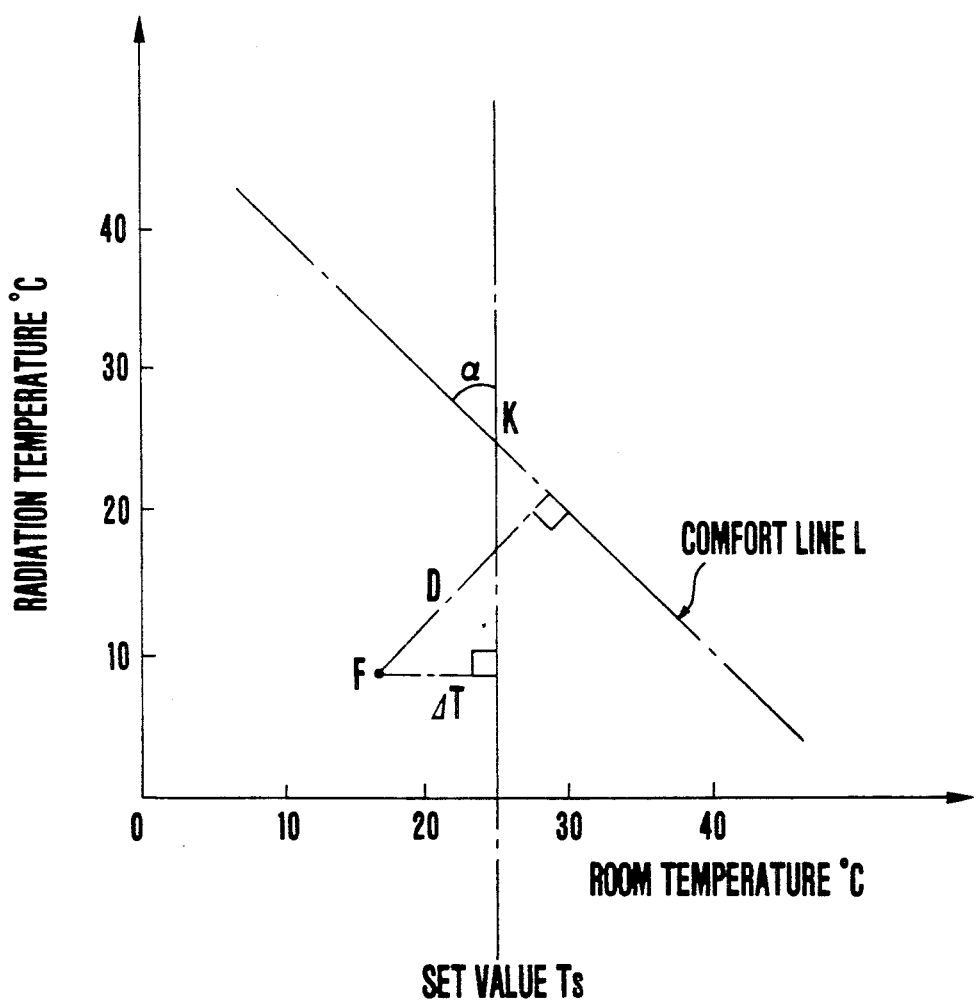
FIG. 5 is a diagram showing the temperature condition of the object to be air-conditioned and the comfort line.

The important factors which decide the comfortableness of the air-conditioned environment in the room 1, are the actual room temperature $T_I$ and the radiation temperature Tw. In general, the comfortable temperature condition can be attained by raising the room temperature $T_I$ as the radiation temperature lowers and by lowering the room temperature $T_I$ as the radiation temperature rises. That is, an inverse proportional relation resides between the room temperature and the radiation temperature. FIG. 5 is a two-dimensional graph representing the temperature condition in the room 1, in which the room temperature is indicated on its abscissa and the radiation temperature Tw is indicated on its ordinate. When a set value Ts of the room temperature required by the person staying in the room is given, the comfort line L representing the comfortable relation between the room temperature $T_I$ and the radiation temperature Tw is determined, depending upon the set value Ts. The comfort line is subjected not only to the influences of the set value Ts of the room temperature, the actual room temperature $T_I$ and the radiation temperature Tw, but also to the influences of air current flowing speed, humidity, working condition and clothing of the person staying in the room or the like. Accordingly, the comfort line L does not always form a straight line and it does always change its location or inclination in a proportional relation to the room temperature set value Ts. In the embodiment illustrated in the drawings, the comfort line L is approximated to a straight line in order to simplify the operational processing to be described later, but this comfort line L is not necessarily limited to the straight line, as hereinafter described.

Referring to the illustrated embodiment, the comfort line L is shown as a straight line which is inclined downward to the right and which crosses a vertical line of the room temperature set value Ts at a point K where the actual room temperature $T_I$ and the radiation temperature Tw are equal to each other, and the comfort line is inclined to the line of the room temperature set value Ts at the angle $\alpha$. In the illustrated example, $\alpha = 45°$, that is, the weighting of $T_I$ is equal to that of Tw. The difference D (distance) between the comfort line L and the current temperature condition F represented by the room temperature $T_I$ and the radiation temperature Tw is represented by the following formula.

$$D = \frac{1}{\sqrt{2}} [2 \times T_s - T_w - T_I] \quad (1)$$

where $T_I$: actual room temperature
Tw: radiation temperature
Ts: set value of room temperature The distance D quantatively represents a deviation of the current temperature condition F from the comfortable temperature condition at the set value of the room temperature and it constitutes a control index for controlling the air-conditioner.

A difference $\Delta T$ between the set value Ts of the room temperature required by the person in the room and the actual room temperature $T_I (\Delta T = T_s - T_I)$ quantatively represents a deviation of the actual room temperature from the first priority temperature at the set value Ts of the room temperature, and it constitutes another control index for controlling the air-conditioner. The air conditioner, more particularly the frequency of the inverter for driving the compressor of the air-conditioner, is controlled according to the hereinafter described fuzzy rule, on the basis of the above-mentioned two control indexes D and $\Delta T$.

Figure 6:
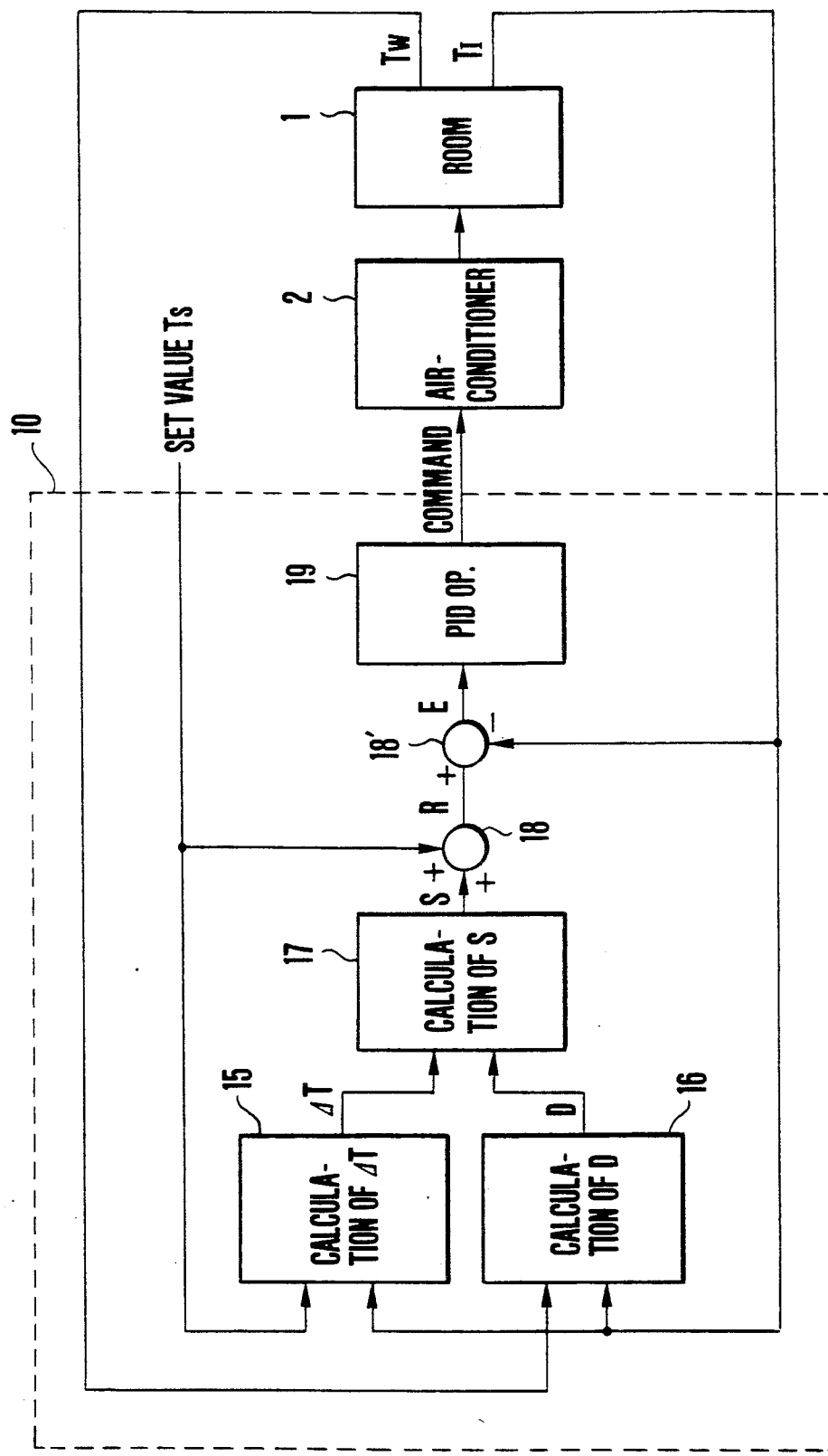
FIG. 6 is a block diagram showing the construction of an embodiment of the control system for the air-conditioner according to the present invention.

FIG. 6 is a block diagram illustrating a construction of the control system for the air-conditioner according to the present invention. The operational controller 10 receives signals indicating the set value of the room temperature Ts, the radiation temperature Tw and the actual room temperature $T_I$, and computes the difference $\Delta T$ between the actual room temperature $T_I$ and the room temperature set value Ts in an operation unit 15 and computes the difference (distance) D between the comfort line L and the current temperature condition F, which is represented by the actual room temperature $T_I$ and the radiation temperature Tw in an operation unit 16. Based on these two control indexes, a modifying operation for modifying the room temperature set value is effected in an operation unit 17 to determine a modification amount S, as will be hereinafter described in more detail. The modification amount S of the room temperature set value thus determined and the room temperature set value Ts are added together in an adding unit 18 to produce a new room temperature set value R ($R = T_s + S$), and the air-conditioner 2 is controlled on the basis of this new set value R to control the actual room temperature and the radiation temperature in the room 1, thereby realizing the comfortable temperature condition. The method for controlling the air-conditioner includes subtracting operation effected by a subtraction unit 18' to obtain a difference E between the new set value R and the actual room temperature $T_I$. The method further includes a calculation of a command by proportioning, integrating and differentiating operation, so-called PID operation of said difference E in an operation unit 19, and said command is fed to the air-conditioner (more particularly, the command value is fed to the inverter for driving the compressor to change the frequency thereof) to make the difference E zero in stable and fast manner.

In the illustrated embodiment of the invention, said modification amount S is obtained according to the fuzzy rule, in the operation unit 117 shown in FIG. 6, on the basis of the above-mentioned two control indexes $\Delta T$ and D. Now the operation will be explained with reference to FIGS. 7(a) and 7(b), FIG. 8 and Table 1.

Figure 7A:
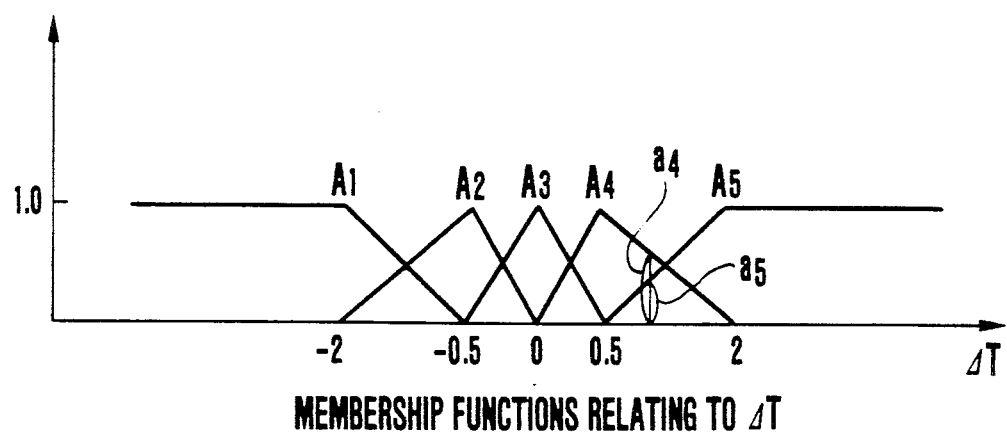
FIG. 7(a) is a graph showing the membership functions.

FIG. 7(a) shows membership functions concerning the difference $\Delta T$ between the actual room temperature $T_I$ and the set value Ts, in which $A_1$, $A_2$, $A_3$, $A_4$ and $A_5$ indicate that $\Delta T$ is Negative Big, Negative Small, Zero, Positive Small and Positive Big, respectively. The values on the ordinate represent the degrees of association of the respective membership functions $A_1$–$A_5$ with the difference $\Delta T$ between the actual value $T_I$ and the set value Ts of the room temperature indicated on the abscissa. It is noted that in case where $\Delta T = 1$, for example, a degree of associations represented by the magnitude $a_4$ resides between the membership function $A_4$ and the difference $\Delta T$ and a degree of association represented by $a_5$ resides between the membership function $A_5$ and the difference $\Delta T$ while no association resides with the other membership functions.

Figure 7B:
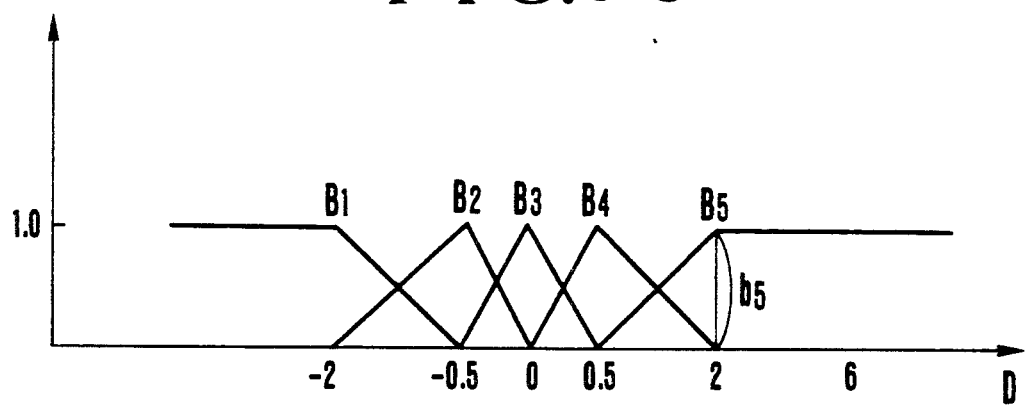
FIG. 7(b) is another graph showing the membership functions.

FIG. 7(b) illustrates the membership functions concerning the difference D between the temperature condition F, which is represented by the actual room temperature $T_I$ and the radiation temperature Tw, and the comfort line L, in which $B_1$, $B_2$, $B_3$, $B_4$ and $B_5$ indicate that D is Negative Big, Negative Small, Zero, Positive Small and Positive Big, respectively. The values on the ordinate represent the degrees of association of the respective membership functions $B_1$–$B_7$ with the deviation D from the comfort line L on the abscissa. It is noted that in the case where $D = 2$, for example, a degree of association represented by the magnitude $b_5$ resides between the membership function $B_5$ and the deviation D, while no association resides with respect to the other membership functions.

Table 1 is a table which shows a fuzzy rule relating to the respective membership functions classified as shown in FIG. 7(a) and FIG. 7(b). The numerical value indicated in the cross point of a column and a row in the Table is a relative value of said modification amount S, for the set value Ts.

TABLE 1

|  |  |  | Deviation D from Comfort Line | | | | |
|---|---|---|---|---|---|---|---|
|  |  |  | $B_1$ NB | $B_2$ NS | $B_3$ 0 | $B_4$ PS | $B_5$ PB |
| Difference $\Delta T$ | $A_1$ | NB | 0 | 0 | −1 | +1 | +1 |
| from Set Value | $A_2$ | NS | 0 | −1 | +1 | +1 | +2 |
|  | $A_3$ | 0 | 0 | 0 | 0 | +2 | +3 |
|  | $A_4$ | PS | 0 | 0 | 0 | +2 | +3 |
|  | $A_5$ | PB | 0 | 0 | 0 | 0 | +3 |

In Table 1, (1) The modification amount S for the set value Ts is +3 when $\Delta T$ is PB and D is PB.

(2) The modification amount S for the set value Ts is +1 when $\Delta T$ is NS and D is PS.

The Table 1 quantatively indicates what degree of the modification for the set value Ts of the room temperature is required to bring the current temperature condition to the comfortable temperature condition in stable and fast manner. This Table 1 is prepared on the basis of empirical and experimental results. The degree of association of the current temperature condition ($\Delta T$, D) to the specific membership function in FIG. 7 is obtained by calculation, and the modification amount S is calculated according to the following formula, on the basis of the result of the above-mentioned calculation and the rule shown in the Table 1.

$$S = k \frac{\sum_i w_i h_i}{\sum_i w_i} \qquad (2)$$

where $w_i$ is a magnitude of the membership function shown in FIG. 7(a) and FIG. 7(b);

$h_i$ is a value indicated in a frame in Table 1 obtained from the membership functions shown in FIG. 7(a) and FIG. 7(b); and k is a coefficient for obtaining an proper value.

In the explanation relating to FIG. 7(a) and FIG. 7(b), the membership functions in the case where $\Delta T=1$, $D=2$ are explained as an example. In this case, referring to the fuzzy rule shown in Table 1, the following relation is obtained.

$$S = k \frac{3a_4b_5 + 3a_5b_5}{a_4b_5 + a_5b_5} \qquad (3)$$

Figure 8:
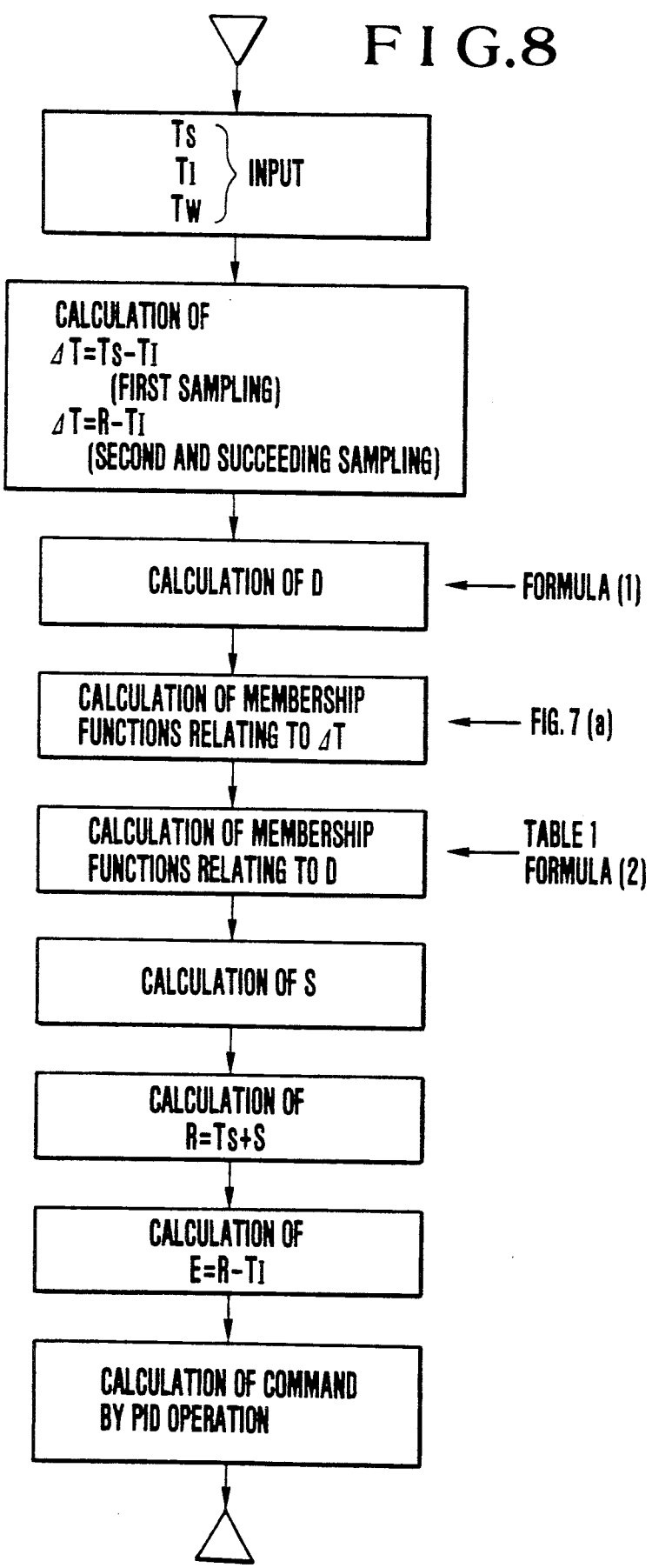
FIG. 8 is a flowchart showing the processing in one embodiment of the invention.

FIG. 8 is a flowchart showing the processing as explained above. In the above described processing, various numerical values are handled and, therefore, it is preferred to use a digital computing circuit which includes operational elements, such as microcomputers. In this case, it is usual to effect analog/digital conversion of the detection signals of the respective temperature detectors and to feed the converted signals into the circuit. On the other hand, the command signals produced as the result of the above operations may be converted into analog signals and then fed to the air-conditioner.

The operations as described with reference to the illustrated embodiments are repeated with suitable sampling periods and the newly set value R as described above is successively modified until a final value is decided. Therefore, in FIG. 8, $\Delta T$ is determined in the first sampling period by $\Delta T = Ts - T_I$ and in the second and succeeding sampling periods by $\Delta T = R - T_I$.

The membership functions as shown in FIG. 7(a) and FIG. 7(b) and the fuzzy rule as shown in the Table 1 are pre-calculated, with due consideration of various factors such as the size of the room, the condition of a person staying in the room, the ability of the air-compressor, the environmental circumstance of the air-conditioner, the ability of the operational circuit, such as precision of controlling the room temperature, the radiation temperature or the like, and these pre-calculated values are stored in memory elements, to enable these values to be used in the respective operations, as required. Under such circumstances, the realization of the finer control and the higher performance requires the increased storing capacity of computer, the increased length of program and the longer operating time. An example for avoiding such problem will be hereinafter explained.

TABLE 2

|  |  | Deviation D from Comfort Line | | | | | | | | | | |
|---|---|---|---|---|---|---|---|---|---|---|---|---|
|  |  | 3.0 | 2.0 | 1.5 | 0.5 | 0.25 | 0 | 0.25 | 0.5 | 1.5 | 2.0 | 3.0 |
| Difference $\Delta T$ | 3.0 |  |  |  |  |  |  |  |  |  |  |  |
| from Set Value | 2.0 |  |  |  |  |  |  |  |  |  |  |  |
|  | 1.5 |  |  |  |  |  |  |  |  |  |  |  |
|  | 0.5 |  |  |  |  |  |  |  |  |  |  |  |
|  | 0.25 |  |  |  |  |  |  |  |  |  |  |  |
|  | 0 |  |  |  |  |  |  |  |  |  |  |  |
|  | 0.25 |  |  |  |  |  |  |  |  |  |  |  |
|  | 0.5 |  |  |  |  |  |  |  | +2.0 | +2.7 | +2.7 | +2.7 |
|  | 1.5 |  |  |  |  |  |  |  | +2.0 | +2.8 | +2.8 | +2.8 |
|  | 2.0 |  |  |  |  |  |  |  | +2.0 | +2.8 | +3.0 | +3.0 |
|  | 3.0 |  |  |  |  |  |  |  | +2.0 | +2.8 | +3.0 | +3.0 |

FIG. 9 and Table 2 illustrate a second embodiment of operation for calculating the modification amount S in the unit 17 in FIG. 6. Considering all combinations of values of two variables, one being the difference $\Delta T$ between the actual value and the set value of the room temperature and the other being the difference D between the current temperature condition and the comfort line L, the modification amounts under all temperature conditions can be calculated by the processing as described above. In practice, however, it will not be necessary to take all temperature conditions into consideration, in view of resolving powers of the temperature sensors, numerical expression in the digital operational circuits, control precisions of the room temperature or other conditions, and it will be enough to select a limited number of discrete combinations. Table 2 is a lookup table of the modification amounts S which was prepared on the basis of FIG. 7 and Table 1, from the above consideration. All the frames of Table 2 are filled with respective numerical values but some of them are not shown. By referring to this table, based on the difference $\Delta T$ between the actual value and the set value of room temperature, and the difference D between the current temperature condition and the comfort line, the approximate value of the modification amount S for the room temperature set value can be immediately found. In this instance, the value is referred to as the approximate value, since the respective frames of the lookup table indicate discrete values. If more precise value for the modification amount S is required, such precise value may be obtained by first order interpolation using two adjoining values, for example.

FIG. 9 is a flowchart showing the above-mentioned processing. Referring to the lookup table shown in Table 2, the modification amounts are previously calculated, while taking the various conditions as described above into consideration, and they are stored in memory elements, so that they can be referred to in the respective operations. This process may somewhat increase the required storing capacity but considerably decreases the digital operations.

In the embodiments as described above, the control system according to the present invention was explained, only with reference to the performance at the time of room heating. In case of room cooling, the membership functions, fuzzy rule and lookup table for the room cooling are adopted.

The comfort line L adopted in the air-conditioner control system according to the present invention can be determined, while taking into consideration the room temperature set value as well as one or more of the following factors:

(1) air flowing speed, (2) humidity, (3) outside air temperature, (4) quantity of motion of the person in the room, (5) amount of clothing of the person in the room, (6) sense or liking of the person in the room, (7) transient condition or stationary condition, (8) morning, noon or night, or the like. Inputting of these parameters into the computer in the air-conditioner control system may be effected from the respective detectors for the above parameters (1), (2) and (3), from the respective setting instruments for the parameters (4), (5) and (6) and from timers for the parameters (7) and (8). The comfort line represented by two coordinates, i.e. the room temperature and the radiation temperature, is not necessarily a straight line and its position on the coordinate plane is not necessarily constant. But it is necessary that the comfort line be a line inclined downward to the right. The term "inverse proportional relation" used with reference to the comfort line does not necessarily mean the inverse proportional relation in mathematically strict sense, but means that the room temperature and the radiation temperature along the comfort line have such relation to each other that the one increases as the other decreases and vice versa.

In the above description, the invention has been explained with reference to the embodiment of the control system for effecting cooling or heating one room by one air-conditioner. However, the present invention can be applied to the system for cooling or heating a plurality of rooms by means of an air-conditioner including a plurality of indoor units and a single outdoor unit.

The control system for the air-conditioner is arranged to modify the room temperature set value so as to meet the two conditions, namely the set room temperature set by the person in the room and the comfortable temperature condition represented by an inverse proportional relation between the room temperature and the radiation temperature. Accordingly, it is possible to attain the comfortable temperature condition as desired by the person in the room, in stable and fast manner. The modification of the room temperature set value can be accomplished by suitable and simple method using the fuzzy logic or the lookup table and thus a control system for the air-conditioner of low cost and high reliability can be realized.

What is claimed is:

1. A control system for an air-conditioner including means for setting a set value of a room temperature, means for detecting an actual value of the room temperature and control means for controlling the air-conditioner to adjust the room temperature depending upon the difference between the set value and the actual value of the room temperature, said control system comprising:

radiation temperature detecting means for detecting a radiation temperature; and means for modifying the set value of the room temperature on the basis of a first control index represented as the difference between the set value and the actual value of the room temperature and a second control index represented as the difference between a temperature condition in the room and a comfort line, said temperature condition being represented by the room temperature and the radiation temperature, and said comfort line defining an inverse proportional relation between the room temperature and the radiation temperature, depending upon the set value of the room temperature.

2. A control system for an air-conditioner according to claim 1, wherein said means for modifying the set value of the room temperature is arranged to effect the modification of the set value of the room temperature on the basis of membership functions concerning said first control index and said second control index, according to a fuzzy rule for determining the amount of modification of the set value of the room temperature by said membership functions.

3. A control system for an air-conditioner according to claim 1, wherein said means for modifying the set value of the room temperature is arranged to effect the modification of the set value of the room temperature, by using a lookup table which determines the amount of modification of the set value of the room temperature in accordance with said first and second control indexes.

* * * * *